United States Patent
Muthusamy et al.

(10) Patent No.: US 10,106,719 B2
(45) Date of Patent: Oct. 23, 2018

(54) ALKYL POLYGLYCOSIDE DERIVATIVE AS BIODEGRADABLE FOAMING SURFACTANT FOR CEMENT

(71) Applicant: Halliburton Energy Services, Inc., Houston, TX (US)

(72) Inventors: Ramesh Muthusamy, Pune (IN); Abhimanyu Pramod Deshpande, Pune (IN); Rahul Chandrakant Patil, Pune (IN); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/458,615

(22) Filed: Mar. 14, 2017

(65) Prior Publication Data

US 2017/0183557 A1 Jun. 29, 2017

Related U.S. Application Data

(62) Division of application No. 13/786,113, filed on Mar. 5, 2013, now Pat. No. 9,701,886.

(51) Int. Cl.

| | |
|---|---|
| *C04B 38/10* | (2006.01) |
| *C04B 24/38* | (2006.01) |
| *C09K 8/473* | (2006.01) |
| *E21B 33/13* | (2006.01) |
| *C04B 28/04* | (2006.01) |
| *E21B 21/00* | (2006.01) |
| *E21B 33/14* | (2006.01) |
| *C04B 103/00* | (2006.01) |
| *C04B 103/40* | (2006.01) |
| *C04B 111/40* | (2006.01) |
| *E21B 43/04* | (2006.01) |

(52) U.S. Cl.
CPC ............ *C09K 8/473* (2013.01); *C04B 24/38* (2013.01); *C04B 28/04* (2013.01); *C04B 38/10* (2013.01); *E21B 21/003* (2013.01); *E21B 33/13* (2013.01); *E21B 33/14* (2013.01); *C04B 2103/0072* (2013.01); *C04B 2103/408* (2013.01); *C04B 2111/40* (2013.01); *E21B 43/04* (2013.01)

(58) Field of Classification Search
CPC ......... C04B 38/10; C04B 24/10; C04B 24/16; C04B 24/38; C04B 28/02; C04B 28/04; C04B 2103/0072; C04B 2103/408; C04B 2111/40; C09K 8/473; E21B 33/13; E21B 33/14; E21B 21/003; E21B 43/04
See application file for complete search history.

(56) References Cited

U.S. PATENT DOCUMENTS

| | | | | |
|---|---|---|---|---|
| 5,221,343 A * | 6/1993 | Grauer | .................... | C04B 24/32 106/729 |
| 5,458,197 A | 10/1995 | Chan | | |
| 5,711,801 A | 1/1998 | Chatterji et al. | | |
| 5,800,053 A | 9/1998 | Shen | | |
| 5,830,831 A | 11/1998 | Chan et al. | | |
| 5,897,699 A | 4/1999 | Chatterji et al. | | |
| 6,419,016 B1 | 7/2002 | Reddy | | |
| 6,627,612 B1 * | 9/2003 | O'Lenick, Jr. | ......... | C07H 15/04 154/25 |
| 6,672,388 B2 * | 1/2004 | McGregor | ............... | C09K 8/52 166/311 |
| 6,951,249 B1 | 10/2005 | Chatterji et al. | | |
| 7,892,348 B2 * | 2/2011 | Lecolier | ................. | C09K 8/473 106/696 |
| 8,124,575 B1 * | 2/2012 | O'Lenick, Jr. | ......... | C11D 1/008 424/401 |
| 8,262,805 B2 | 9/2012 | Hodge et al. | | |
| 8,268,766 B1 * | 9/2012 | O'Lenick, Jr. | ......... | C07H 15/04 424/401 |
| 8,287,639 B2 * | 10/2012 | White | ................. | C04B 20/1022 106/659 |
| 8,299,009 B2 | 10/2012 | Hodge et al. | | |
| 8,653,008 B2 * | 2/2014 | Selle | ...................... | C09K 8/528 166/308.6 |
| 9,012,379 B2 * | 4/2015 | Muthusamy | ........... | C09K 8/601 507/211 |
| 2003/0006040 A1 | 1/2003 | McGregor et al. | | |
| 2006/0060354 A1 | 3/2006 | Lewis et al. | | |

(Continued)

FOREIGN PATENT DOCUMENTS

| | | |
|---|---|---|
| EP | 1238952 B1 | 12/2004 |
| WO | 99/29408 A1 | 6/1999 |

(Continued)

OTHER PUBLICATIONS

Rhode et al "New Ionic Derivatives of Alkyl Polyglycosides—Synthesis and Properties", Alkyl Polyglycosides Technology, Properties and Applications, 1997 (pp. 139-149).*

(Continued)

*Primary Examiner* — Anthony J Green
(74) *Attorney, Agent, or Firm* — Craig Roddy; Baker Botts L.L.P.

(57) ABSTRACT

A cement composition: (a) a hydraulic cement; (b) water; and (c) an alkyl polyglycoside derivative, wherein the alkyl polyglycoside derivative is selected from the group consisting of: sulfonates, betaines, an inorganic salt of any of the foregoing, and any combination of any of the foregoing. A method comprising the steps of: (A) forming the cement composition; and (B) introducing the cement composition into the well. Preferably, the cement composition is foamed.

20 Claims, No Drawings

(56) References Cited

U.S. PATENT DOCUMENTS

| | | |
|---|---|---|
| 2006/0137879 A1 | 6/2006 | Chan |
| 2007/0181307 A1 | 8/2007 | Yang |
| 2008/0011486 A1 | 1/2008 | Zhang et al. |
| 2009/0071650 A1* | 3/2009 | Roddy .................... C04B 38/10 166/293 |
| 2009/0194278 A1 | 8/2009 | De Francesco |
| 2010/0010108 A1* | 1/2010 | Lecolier .................. C04B 28/02 521/83 |
| 2011/0206790 A1 | 8/2011 | Weiss |
| 2012/0160131 A1 | 6/2012 | Roddy |
| 2014/0371351 A1* | 12/2014 | Dantin .................... C04B 28/02 524/5 |

FOREIGN PATENT DOCUMENTS

| | | | | |
|---|---|---|---|---|
| WO | WO-2004044378 A1 * | 5/2004 | .......... B01F 17/0085 |
| WO | 2009/083178 A1 | 7/2009 | |
| WO | WO-2009083178 A1 * | 7/2009 | .............. C04F 24/10 |
| WO | 2010/061163 A1 | 3/2010 | |

OTHER PUBLICATIONS

Search Report issued in related European Application No. 13876780.1, dated Aug. 23, 2016 (4 pages).

Examination Report issued in related Australian Patent Application No. 2013380919, dated Nov. 4, 2015 (4 pages).

International Preliminary Report on Patentability issued in related PCT Application No. PCT/US2013/077447, dated Sep. 17, 2015 (7 pages).

International Search Report and Written Opinion issued in related PCT Application No. PCT/US2013/077447, dated Apr. 21, 2014 (12 pages).

"Safety Data Sheet: Terradril S 853 B," Emery Oleochemicals, SDS No. 1067000, May 10, 2009 (4 pages).

"Cementing: ZoneSeal Isolation Process," Halliburton, 2008 (11 pages).

* cited by examiner

ALKYL POLYGLYCOSIDE DERIVATIVE AS BIODEGRADABLE FOAMING SURFACTANT FOR CEMENT

CROSS-REFERENCE TO RELATED APPLICATIONS

This is a divisional of U.S. application Ser. No. 13/786,113 filed on Mar. 5, 2013, now U.S. Pat. No. 9,701,886, entitled "ALKYL POLYGLYCOSIDE DERIVATIVE AS BIODEGRADABLE FOAMING SURFACTANT FOR CEMENT," the entire disclosure of which is hereby incorporated by reference.

TECHNICAL FIELD

The disclosures are in the field of producing crude oil or natural gas from subterranean formations. More specifically, the disclosures generally relate to cement compositions and methods of cementing a well. The cement compositions include a foaming surfactant.

BACKGROUND

Oil & Gas Wells

To produce oil or gas from a reservoir, a well is drilled into a subterranean formation, which may be the reservoir or adjacent to the reservoir. Typically, a wellbore of a well must be drilled hundreds or thousands of feet into the earth to reach a hydrocarbon-bearing formation.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Drilling is the process of drilling the wellbore. After a portion of the wellbore is drilled, sections of steel pipe, referred to as casing, which are slightly smaller in diameter than the borehole, are placed in at least the uppermost portions of the wellbore. The casing provides structural integrity to the newly drilled borehole.

Cementing is a common well operation. For example, hydraulic cement compositions can be used in cementing operations in which a string of pipe, such as casing or liner, is cemented in a wellbore. The cement stabilizes the pipe in the wellbore and prevents undesirable migration of fluids along the annulus between the wellbore and the outside of the casing or liner from one zone along the wellbore to the next. Where the wellbore penetrates into a hydrocarbon-bearing zone of a subterranean formation, the casing can later be perforated to allow fluid communication between the zone and the wellbore. The cemented casing also enables subsequent or remedial separation or isolation of one or more production zones of the wellbore by using downhole tools, such as packers or plugs, or by using other techniques, such as forming sand plugs or placing cement in the perforations. Hydraulic cement compositions can also be utilized in intervention operations, such as in plugging highly permeable zones, or fractures in zones, that may be producing too much water, plugging cracks or holes in pipe strings, and the like.

Cementing and Hydraulic Cement Compositions

In a cementing operation, a hydraulic cement, water, and any other components are mixed to form a hydraulic cement composition in fluid form. The hydraulic cement composition is pumped as a fluid (typically in the form of suspension or slurry) into a desired location in the wellbore. For example, in cementing a casing or liner, the hydraulic cement composition is pumped into the annular space between the exterior surfaces of a pipe string and the borehole (that is, the wall of the wellbore). The hydraulic cement composition should be a fluid for a sufficient time before setting to allow for pumping the composition into the wellbore and for placement in a desired downhole location in the well. The cement composition is allowed time to set in the annular space, thereby forming an annular sheath of hardened, substantially impermeable cement. The hardened cement supports and positions the pipe string in the wellbore and fills the annular space between the exterior surfaces of the pipe string and the borehole of the wellbore.

It is important to maintain a cement in a pumpable slurry state until it is placed in a desired portion of the well. For this purpose, a set retarder can be used in a cement slurry, which retards the setting process and provides adequate pumping time to place the cement slurry. Alternatively or in addition, a set intensifier can be used, which accelerates the setting process. The retarder or intensifier can be used to help control the thickening time or setting of a cement composition.

Foamed Cement Slurries

Light-weight cement slurry is often used in cementing of oil wells to prevent the exertion of excess hydrostatic pressure on the subterranean formation, which otherwise could fracture the formation. Low-density materials such as hallow beads are used to design light-weight cement slurries.

However, foamed cement compositions have unique features of high compressibility and thermal insulation properties as compared to non-foamed cement compositions. Foamed cement contains gas maintained under sufficient pressure so as to prevent gas migration in the fluid during the transition of the cement slurry into a set solid mass. Also, the set foamed cement has ductile property, which is desirable for sustaining the stress.

Normally, foamed cements have been prepared using a gas and a foaming surfactant. Even though there are many foaming surfactants known in the literature, they have limitations such as reduction in compressive strength, gelation with mixing fluids (i.e., increase in slurry viscosity), incompatibility with co-additives, and poor environmental compliance. Therefore, there is a need for new surfactant that performs better over the existing materials.

Inorganic Salts in Cement Slurries

Cement slurries are often formed with water, seawater, or, for various reasons, inorganic salts such as NaCl or $CaCl_2$ may be added. It is important that a foaming surfactant be compatible for use in a cement slurry formed with seawater or having other inorganic salts dissolved in the water. Not all foaming surfactants are compatible for use with dissolved salts.

Fluid-Loss Control

Fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth. The extent of fluid losses to the formation may range from minor (for example less than 10 bbl/hr) referred to as seepage loss to severe (for example, greater than 500 bbl/hr) referred to as complete loss. As a result, the service provided by such fluid is more difficult to achieve. For example, a drilling fluid may be lost to the formation, resulting in the circulation of the fluid in the wellbore being too low to allow for further drilling of the wellbore. Also, a secondary cement or sealant composition may be lost to the formation as it is being placed in the wellbore, thereby rendering the secondary operation ineffective in maintaining isolation of the formation.

The usual approach to fluid-loss control is to substantially reduce the permeability of the matrix of the zone with a fluid-loss control material that blocks the permeability at or near the face of the rock matrix of the zone. For example, the fluid-loss control material may be a particulate that has a size selected to bridge and plug the pore throats of the matrix. All else being equal, the higher the concentration of the appropriately sized particulate, the faster bridging will occur. As the fluid phase carrying the fluid-loss control material leaks into the formation, the fluid-loss control material bridges the pore throats of the matrix of the formation and builds up on the surface of the borehole or fracture face or penetrates only a little into the matrix. The buildup of solid particulate or other fluid-loss control material on the walls of a wellbore or a fracture is referred to as a filtercake. Depending on the nature of a fluid phase and the filtercake, such a filtercake may help block the further loss of a fluid phase (referred to as a filtrate) into the subterranean formation. A fluid-loss control material is specifically designed to lower the volume of a filtrate that passes through a filter medium. Accordingly, a fluid-loss control material is sometimes referred to as a filtration control agent.

SUMMARY OF THE DISCLOSURE

A cement composition is provided, the composition comprising:
(a) a hydraulic cement;
(b) water; and
(c) an alkyl polyglycoside derivative, wherein the alkyl polyglycoside derivative is selected from the group consisting of: sulfonates, betaines, an inorganic salt of any of the foregoing, and any combination of any of the foregoing.

Preferably, the cement composition additionally comprises a gas, whereby the cement composition is foamed.

A method of cementing a portion of a well is provided, the method comprising the steps of: (A) forming a cement composition according to the disclosure; and (B) introducing the cement composition into the well.

These and other aspects of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed, but, on the contrary, the disclosure is to cover all modifications and alternatives falling within the spirit and scope of the disclosure as expressed in the appended claims.

DETAILED DESCRIPTION OF PRESENTLY PREFERRED EMBODIMENTS AND BEST MODE

Definitions and Usages
General Interpretation
The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables or other scientific symbols used herein are selected arbitrarily or according to convention. Other algebraic variables can be used.

The control or controlling of a condition includes any one or more of maintaining, applying, or varying of the condition. For example, controlling the temperature of a substance can include heating, cooling, or thermally insulating the substance.

Oil and Gas Reservoirs
In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name it.

A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

Well Servicing and Well Fluids
To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a well fluid into a well.

Well Terms

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. The "borehole" usually refers to the inside wellbore wall, that is, the rock surface or wall that bounds the drilled hole. A wellbore can have portions that are vertical, horizontal, or anything in between, and it can have portions that are straight, curved, or branched. As used herein, "uphole," "downhole," and similar terms are relative to the direction of the wellhead, regardless of whether a wellbore portion is vertical or horizontal.

As used herein, introducing "into a well" means introducing at least into and through the wellhead. According to various techniques known in the art, tubulars, equipment, tools, or well fluids can be directed from the wellhead into any desired portion of the wellbore.

As used herein, the word "tubular" means any kind of structural body in the general form of a tube. Examples of tubulars include, but are not limited to, a drill pipe, a casing, a tubing string, a line pipe, and a transportation pipe. Tubulars can also be used to transport fluids such as oil, gas, water, liquefied methane, coolants, and heated fluids into or out of a subterranean formation. For example, a tubular can be placed underground to transport produced hydrocarbons or water from a subterranean formation to another location. Tubulars can be of any suitable body material, but in the oilfield they are most commonly of steel.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, a "well fluid" broadly refers to any fluid adapted to be introduced into a well for any purpose. A well fluid can be, for example, a drilling fluid, a cement composition, a treatment fluid, or a spacer fluid. If a well fluid is to be used in a relatively small volume, for example less than about 200 barrels (about 8,400 US gallons or about 32 $m^3$), it is sometimes referred to as a wash, dump, slug, or pill.

A "portion" of a well, tubular, or pipeline refers to any downhole portion of the well or any portion of the length of a pipeline or any portion of a tubular, as the case may be.

A "zone" refers to an interval of rock along a wellbore that is differentiated from uphole and downhole zones based on hydrocarbon content or other features, such as permeability, composition, perforations or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a well fluid is directed to flow from the wellbore. As used herein, "into a treatment zone" means into and through the wellhead and, additionally, through the wellbore and into the treatment zone.

Fluid loss refers to the undesirable leakage of a fluid phase of any type of well fluid into the permeable matrix of a zone, which zone may or may not be a treatment zone. Fluid-loss control refers to treatments designed to reduce such undesirable leakage.

Generally, the greater the depth of the formation, the higher the static temperature and pressure of the formation. Initially, the static pressure equals the initial pressure in the formation before production. After production begins, the static pressure approaches the average reservoir pressure.

Deviated wells are wellbores inclined at various angles to the vertical. Complex wells include inclined wellbores in high-temperature or high-pressure downhole conditions.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the well fluid on the BHST during treatment. The design temperature for a well fluid is sometimes referred to as the bottom hole circulation temperature ("BHCT"). Because well fluids may be considerably cooler than BHST, the difference between the two temperatures can be quite large. Ultimately, if left undisturbed, a subterranean formation will return to the BHST.

Substances, Chemicals, and Derivatives

A substance can be a pure chemical or a mixture of two or more different chemicals.

As used herein, a "polymer" or "polymeric material" includes polymers, copolymers, terpolymers, etc. In addition, the term "copolymer" as used herein is not limited to the combination of polymers having two monomeric units, but includes any combination of monomeric units, e.g., terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Physical States and Phases

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Fluids

A fluid can be a single phase or a dispersion. In general, a fluid is an amorphous substance that is or has a continuous phase of particles that are smaller than about 1 micrometer that tends to flow and to conform to the outline of its container.

Examples of fluids are gases and liquids. A gas (in the sense of a physical state) refers to an amorphous substance that has a high tendency to disperse (at the molecular level) and a relatively high compressibility. A liquid refers to an amorphous substance that has little tendency to disperse (at the molecular level) and relatively high incompressibility. The tendency to disperse is related to Intermolecular Forces (also known as van der Waal's Forces). (A continuous mass of a particulate, e.g., a powder or sand, can tend to flow as a fluid depending on many factors such as particle size distribution, particle shape distribution, the proportion and nature of any wetting liquid or other surface coating on the particles, and many other variables. Nevertheless, as used herein, a fluid does not refer to a continuous mass of particulate as the sizes of the solid particles of a mass of a particulate are too large to be appreciably affected by the range of Intermolecular Forces.)

Every fluid inherently has at least a continuous phase. A fluid can have more than one phase. The continuous phase of a well fluid is a liquid under Standard Laboratory Conditions. For example, a well fluid can be in the form of a slurry or suspension (larger solid particles dispersed in a liquid phase), a sol (smaller solid particles dispersed in a liquid phase), an emulsion (liquid particles dispersed in another liquid phase), or a foam (a gas phase dispersed in a liquid phase).

Cement and Cement Compositions

In the most general sense of the word, a "cement" is a binder, that is, a substance that sets and can bind other materials together. As used herein, "cement" refers to an inorganic cement that, when mixed with water, will begin to set and harden into a concrete material.

As used herein, the term "set" means the process of becoming gelled to a gel state, solid, or hard by curing.

As used herein, a "cement composition" is a material including at least one inorganic cement. A cement composition can also include additives. Some cement compositions can include water or be mixed with water. Depending on the type of cement, the chemical proportions, when a cement composition is mixed with water it can begin setting to form a phase solid material.

A cement can be characterized as non-hydraulic or hydraulic.

Non-hydraulic cements (e.g., gypsum plaster, Sorel cements) must be kept dry in order to retain their strength. A non-hydraulic cement produces hydrates that are not resistant to water. If the proportion of water to a non-hydraulic cement is too high, the cement composition will not set into a hardened material.

Hydraulic cements (e.g., Portland cement) harden because of hydration, chemical reactions that occur independently of the mixture's water content; they can harden even underwater or when constantly exposed to wet weather. The chemical reaction that results when the dry cement powder is mixed with water produces hydrates that have extremely low solubility in water. The cement composition sets by a hydration process, and it passes through a gel phase to solid phase.

More particularly, Portland cement is formed from a clinker such as a clinker according to the European Standard EN197-1: "Portland cement clinker is a hydraulic material which shall consist of at least two-thirds by mass of calcium silicates (3 $CaO.SiO_2$ and 2 $CaO.SiO_2$), the remainder consisting of aluminum- and iron-containing clinker phases and other compounds. The ratio of CaO to $SiO_2$ shall not be less than 2.0. The magnesium oxide content (MgO) shall not exceed 5.0% by mass." The American Society of Testing Materials ("ASTM") standard "C 150" defines Portland cement as "hydraulic cement (cement that not only hardens by reacting with water but also forms a water-resistant product) produced by pulverizing clinkers consisting essentially of hydraulic calcium silicates, usually containing one or more of the forms of calcium sulfate as an inter ground addition." In addition, Portland cements typically have a ratio of CaO to $SiO_2$ of less than 4.0.

The American Society for Testing and Materials (ASTM) has established a set of standards for a Portland cement to meet to be considered an ASTM cement. These standards include Types I, II, III, IV, and V.

The American Petroleum Institute (API) has established a set of standards that a Portland cement must meet to be considered an API cement. The standards include Classes A, B, C, D, E, F, G, H, I, and J.

As used herein, a "light-weight" cement slurry refers to a cement slurry having a density less than 15 ppg (1020 $kg/m^3$), and typically in the range of about 8.5 ppg (1020 $kg/m^3$) to about 15 ppg (1800 $kg/m^3$).

As used herein, "high compressibility" regarding a cement slurry means higher compressibility than for an otherwise similar cement slurry composition without any foaming.

As used herein, good thermal insulation means higher than thermal insulating property than for an otherwise similar cement slurry composition without any foaming.

Cement Additives

Cement compositions can contain other additives, including but not limited to resins, latex, stabilizers, silica, microspheres, aqueous superabsorbers, viscosifying agents, suspending agents, dispersing agents, salts, accelerants, retardants, high-density materials, low-density materials, fluid loss control agents, elastomers, vitrified shale, gas migration control additives, formation conditioning agents, or other additives or modifying agents, or combinations thereof.

Of course, the additives should be compatible with the cement slurry and its function. Physical or chemical interaction of an additive with other components or additives (co-additives) can lead to their deactivation or poor performance of the cement slurry. Two additives are incompatible if undesirable physical or chemical interactions occur when mixed in a cement slurry.

Cementing and Other Uses for Cement Compositions

During well completion, it is common to introduce a cement composition into an annulus in the wellbore. For example, in a cased hole, the cement composition is placed into and allowed to set in the annulus between the wellbore and the casing in order to stabilize and secure the casing in the wellbore. After setting, the set cement composition should have a low permeability. Consequently, oil or gas can be produced in a controlled manner by directing the flow of oil or gas through the casing and into the wellhead.

Cement compositions can also be used, for example, in well-plugging operations or gravel-packing operations. Cement compositions can also be used to control fluid loss or migration in zones.

During placement of a cement composition, it is necessary for the cement composition to remain pumpable during introduction into the subterranean formation or the well and until the cement composition is situated in the portion of the subterranean formation or the well to be cemented. After the cement composition has reached the portion of the well to be cemented, the cement composition ultimately sets. A cement composition that thickens too quickly while being pumped can damage pumping equipment or block tubing or pipes, and a cement composition that sets too slowly can cost time and money while waiting for the cement composition to set.

Pumping Time and Thickening Time

As used herein, the "pumping time" is the total time required for pumping a hydraulic cementing composition into a desired portion or zone of the well in a cementing operation plus a safety factor.

As used herein, the "thickening time" is how long it takes for a cement composition to become unpumpable at a specified temperature and specified pressure. The pumpability of a cement composition is related to the consistency of the composition. The consistency of a cement composition is measured in Bearden units of consistency (Bc), a dimensionless unit with no direct conversion factor to the more common units of viscosity. As used herein, a setting fluid is considered to be "pumpable" so long as the fluid has an apparent viscosity less than 30,000 mPa·s (cP) (independent of any gel characteristic) or a consistency of less than 70 Bc. A setting fluid becomes "unpumpable" when the consistency of the composition reaches at least 70 Bc.

As used herein, the consistency of a cement composition is measured according to ANSI/API Recommended Practice 10B-2 as follows. The cement composition is mixed and then placed in the test cell of a High-Temperature, High-Pressure (HTHP) consistometer, such as a FANN™ Model 275 or a CHANDLER™ Model 8240. The cement composition is tested in the HTHP consistometer at the specified temperature and pressure. Consistency measurements are taken continuously until the consistency of the cement composition exceeds 70 Bc.

Of course, the thickening time should be greater than the pumping time for a cementing operation.

Setting and Compressive Strength

Depending on the composition and the conditions, it can take just a few minutes up to 72 hours or longer for some cement compositions to initially set. A cement composition sample that is at least initially set is suitable for destructive compressive strength testing.

Compressive strength is defined as the capacity of a material to withstand axially directed pushing forces. The compressive strength a setting composition attains is a function of both curing time and temperature, among other things.

The compressive strength of a cement composition can be used to indicate whether the cement composition has set. As used herein, a cement composition is considered "initially set" when the cement composition has developed a compressive strength of 50 psi using the non-destructive compressive strength method. As used herein, the "initial setting time" is the difference in time between when the cement is mixed with water and when the cement composition is initially set. Some cement compositions can continue to develop a compressive strength greater than 50 psi over the course of several days. The compressive strength of certain kinds of cement compositions can reach over 10,000 psi.

Compressive strength is typically measured at a specified time after the cement composition has been mixed and at a specified temperature and pressure conditions. If not otherwise stated, the setting and the initial setting time is determined at a temperature of 212° F. and an atmospheric pressure of 3,000 psi. Compressive strength can also be measured at a specific time and temperature after the cement composition has been mixed, for example, in the range of about 24 to about 72 hours at a design temperature and pressure, for example, a temperature of 212° F. and 3,000 psi. According to ANSI/API Recommended Practice 10B-2, compressive strength can be measured by either a destructive method or non-destructive method.

The destructive method mechanically tests the strength of cement composition samples at various points in time by crushing the samples in a compression-testing machine. The destructive method is performed as follows. The cement composition is mixed and then cured. The cured cement composition sample is placed in a compressive strength testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression device. The actual compressive strength is reported in units of pressure, such as pound-force per square inch (psi) or megapascals (MPa).

The non-destructive method continually measures a correlated compressive strength of a cement composition sample throughout the test period by utilizing a non-destructive sonic device such as an Ultrasonic Cement Analyzer (UCA) available from Fann Instruments in Houston, Tex. As used herein, the "compressive strength" of a cement composition is measured utilizing an Ultrasonic Cement Analyzer as follows. The cement composition is mixed. The cement composition is placed in an Ultrasonic Cement Analyzer, in which the cement composition is heated to the specified temperature and pressurized to the specified pressure. The UCA continually measures the transit time of the acoustic signal through the sample. The UCA device contains preset algorithms that correlate transit time through the sample to compressive strength. The UCA reports the compressive strength of the cement composition in units of pressure, such as psi or megapascals (MPa).

Cement Testing Conditions

As used herein, if any test (e.g., thickening time, compressive strength, or permeability) requires the step of mixing the setting composition, cement composition, or the like, then the mixing step is performed according to ANSI/API Recommended Practice 10B-2 as follows. Any of the ingredients that are a dry particulate substance are pre-blended. The liquid is added to a mixing container and the container is then placed on a mixer base. For example, the mixer can be a Lightning Mixer. The motor of the base is then turned on and maintained at about 4,000 revolutions per minute (rpm). The pre-blended dry ingredients are added to the container at a uniform rate in not more than 15 seconds (s). After all the dry ingredients have been added to the liquid ingredients in the container, a cover is then placed on the container, and the composition is mixed at 12,000 rpm (+/−500 rpm) for 35 s (+/−1 s). It is to be understood that the composition is mixed under Standard Laboratory Conditions (about 77° F. and about 1 atmosphere pressure).

It is also to be understood that if any test (e.g., thickening time or compressive strength or permeability) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 77° F. and then placed into the testing apparatus and the temperature of the cement composition can be ramped up to the specified temperature. As used herein, the rate of ramping up the temperature is in the range of about 3° F./min to about 5° F./min. After the cement composition is ramped up to the specified temperature and possibly pressure, the cement composition is maintained at that temperature and pressure for the duration of the testing.

As used herein, if any test (e.g., compressive strength or permeability) requires the step of "curing the cement composition" or the like, then the curing step is performed according to ANSI/API Recommended Practice 10B-2 as follows. After the cement composition has been mixed, it is poured into a curing mold. The curing mold is placed into a pressurized curing chamber and the curing chamber is maintained at a temperature of 212° F. and a pressure of 3000 psi. The cement composition is allowed to cure for the length of time necessary for the composition to set. After the composition has set, the curing mold is placed into a water cooling bath until the cement composition sample is tested.

Cement Retarders

As used herein, a "retarder" is a chemical agent used to increase the thickening time of a cement composition. The need for retarding the thickening time of a cement composition tends to increase with depth of the zone to be cemented due to the greater time required to complete the cementing operation and the effect of increased temperature on the setting of the cement. A longer thickening time at the design temperature allows for a longer pumping time that may be required.

Foamed Fluids

A foamed fluid is fluid having a liquid external phase that includes a dispersion of undissolved gas bubbles that foam the liquid, usually with the aid of a chemical (a foaming agent) in the liquid phase to achieve stability.

Any suitable gas may be used for foaming, including nitrogen, carbon dioxide, air, or methane. A foamed treatment fluid may be desirable to, among other things, reduce the amount of fluid that is required in a water sensitive subterranean formation, to reduce fluid loss in the formation, or to provide enhanced proppant suspension. In examples of such embodiments, the gas may be present in the range of from about 5% to about 98% by volume of the treatment fluid, and more preferably in the range of from about 20% to about 80% by volume of the treatment fluid. The amount of gas to incorporate in the fluid may be affected by many factors including the viscosity of the fluid and the bottom hole temperatures and pressures involved in a particular application. One of ordinary skill in the art, with the benefit of this disclosure, will recognize how much gas, if any, to incorporate into a foamed treatment fluid.

Surfactants

Surfactants are compounds that lower the surface tension of a liquid, the interfacial tension between two liquids, or that between a liquid and a solid, or that between a liquid and a gas. Surfactants may act as detergents, wetting agents, emulsifiers, foaming agents, and dispersants.

Surfactants are usually organic compounds that are amphiphilic, meaning they contain both hydrophobic groups ("tails") and hydrophilic groups ("heads"). Therefore, a surfactant contains both a water-insoluble (or oil soluble) portion and a water-soluble portion.

A surfactant package can include one or more different chemical surfactants.

Biodegradability

Biodegradable means the process by which complex molecules are broken down by micro-organisms to produce simpler compounds. Biodegradation can be either aerobic (with oxygen) or anaerobic (without oxygen). The potential for biodegradation is commonly measured on well fluids or their components to ensure that they do not persist in the environment. A variety of tests exist to assess biodegradation.

As used herein, a substance is considered "biodegradable" if the substance passes a ready biodegradability test or an inherent biodegradability test. It is preferred that a substance is first tested for ready biodegradability, and only if the substance does not pass at least one of the ready biodegradability tests then the substance is tested for inherent biodegradability.

In accordance with Organisation for Economic Co-operation and Development ("OECD") guidelines, the following six tests permit the screening of chemicals for ready biodegradability. As used herein, a substance showing more than 60% biodegradability in 28 days according to any one of the six ready biodegradability tests is considered a pass level for classifying it as "readily biodegradable," and it may be assumed that the substance will undergo rapid and ultimate degradation in the environment. The six ready biodegradability tests are: (1) 301A: DOC Die-Away; (2) 301B: $CO_2$ Evolution (Modified Sturm Test); (3) 301C: MITI (I) (Ministry of International Trade and Industry, Japan); (4) 301D: Closed Bottle; (5) 301E: Modified OECD Screening; and (6) 301F: Manometric Respirometry. The six ready biodegradability tests are described below:

For the 301A test, a measured volume of inoculated mineral medium, containing 10 mg to 40 mg dissolved organic carbon per liter (DOC/l) from the substance as the nominal sole source of organic carbon, is aerated in the dark or diffuse light at 22±2° C. Degradation is followed by DOC analysis at frequent intervals over a 28-day period. The degree of biodegradation is calculated by expressing the concentration of DOC removed (corrected for that in the blank inoculum control) as a percentage of the concentration initially present. Primary biodegradation may also be calculated from supplemental chemical analysis for parent compound made at the beginning and end of incubation.

For the 301B test, a measured volume of inoculated mineral medium, containing 10 mg to 20 mg DOC or total organic carbon per liter from the substance as the nominal sole source of organic carbon is aerated by the passage of carbon dioxide-free air at a controlled rate in the dark or in diffuse light. Degradation is followed over 28 days by determining the carbon dioxide produced. The $CO_2$ is trapped in barium or sodium hydroxide and is measured by titration of the residual hydroxide or as inorganic carbon. The amount of carbon dioxide produced from the test substance (corrected for that derived from the blank inoculum) is expressed as a percentage of $ThCO_2$. The degree of biodegradation may also be calculated from supplemental DOC analysis made at the beginning and end of incubation.

For the 301C test, the oxygen uptake by a stirred solution, or suspension, of the substance in a mineral medium, inoculated with specially grown, unadapted micro-organisms, is measured automatically over a period of 28 days in a darkened, enclosed respirometer at 25+/−1° C. Evolved carbon dioxide is absorbed by soda lime. Biodegradation is expressed as the percentage oxygen uptake (corrected for blank uptake) of the theoretical uptake (ThOD). The percentage primary biodegradation is also calculated from supplemental specific chemical analysis made at the beginning and end of incubation, and optionally ultimate biodegradation by DOC analysis.

For the 301D test, a solution of the substance in mineral medium, usually at 2-5 milligrams per liter (mg/l), is inoculated with a relatively small number of micro-organisms from a mixed population and kept in completely full, closed bottles in the dark at constant temperature. Degradation is followed by analysis of dissolved oxygen over a 28 day period. The amount of oxygen taken up by the microbial population during biodegradation of the test substance, corrected for uptake by the blank inoculum run in parallel, is expressed as a percentage of ThOD or, less satisfactorily COD.

For the 301E test, a measured volume of mineral medium containing 10 to 40 mg DOC/l of the substance as the nominal sole source of organic carbon is inoculated with 0.5 ml effluent per liter of medium. The mixture is aerated in the dark or diffused light at 22+2° C. Degradation is followed by DOC analysis at frequent intervals over a 28 day period. The degree of biodegradation is calculated by expressing the concentration of DOC removed (corrected for that in the blank inoculums control) as a percentage of the concentration initially present. Primary biodegradation may also be calculated from supplemental chemical analysis for the parent compound made at the beginning and end of incubation.

For the 301F test, a measured volume of inoculated mineral medium, containing 100 mg of the substance per liter giving at least 50 to 100 mg ThOD/l as the nominal sole source of organic carbon, is stirred in a closed flask at a constant temperature (+1° C. or closer) for up to 28 days. The consumption of oxygen is determined either by measuring the quantity of oxygen (produced electrolytically) required to maintain constant gas volume in the respirometer flask or from the change in volume or pressure (or a combination of the two) in the apparatus. Evolved carbon dioxide is absorbed in a solution of potassium hydroxide or another suitable absorbent. The amount of oxygen taken up by the microbial population during biodegradation of the test substance (corrected for uptake by blank inoculum, run in parallel) is expressed as a percentage of ThOD or, less satisfactorily, COD. Optionally, primary biodegradation may also be calculated from supplemental specific chemical analysis made at the beginning and end of incubation, and ultimate biodegradation by DOC analysis.

In accordance with OECD guidelines, the following three tests permit the testing of chemicals for inherent biodegradability. As used herein, a substance with a biodegradation or biodegradation rate of >20% is regarded as "inherently primary biodegradable." A substance with a biodegradation or biodegradation rate of >70% is regarded as "inherently ultimate biodegradable." As used herein, a substance passes the inherent biodegradability test if the substance is either regarded as inherently primary biodegradable or inherently ultimate biodegradable when tested according to any one of three inherent biodegradability tests. The three tests are: (1) 302A: 1981 Modified SCAS Test; (2) 302B: 1992 Zahn-Wellens Test; and (3) 302C: 1981 Modified MITI Test. Inherent biodegradability refers to tests which allow prolonged exposure of the test compound to microorganisms, a more favorable test compound to biomass ratio, and chemical or other conditions which favor biodegradation. The three inherent biodegradability tests are described below:

For the 302A test, activated sludge from a sewage treatment plant is placed in an aeration (SCAS) unit. The substance and settled domestic sewage are added, and the mixture is aerated for 23 hours. The aeration is then stopped, the sludge allowed to settle and the supernatant liquor is removed. The sludge remaining in the aeration chamber is then mixed with a further aliquot of the substance and sewage and the cycle is repeated. Biodegradation is established by determination of the dissolved organic carbon content of the supernatant liquor. This value is compared with that found for the liquor obtained from a control tube dosed with settled sewage only.

For the 302B test, a mixture containing the substance, mineral nutrients, and a relatively large amount of activated sludge in aqueous medium is agitated and aerated at 20° C. to 25° C. in the dark or in diffuse light for up to 28 days. A blank control, containing activated sludge and mineral nutrients but no substance, is run in parallel. The biodegradation process is monitored by determination of DOC (or COD) in filtered samples taken at daily or other time intervals. The ratio of eliminated DOC (or COD), corrected for the blank, after each time interval, to the initial DOC value is expressed as the percentage biodegradation at the sampling time. The percentage biodegradation is plotted against time to give the biodegradation curve.

For the 302C test, an automated closed-system oxygen consumption measuring apparatus (BOD-meter) is used. The substance to be tested is inoculated in the testing vessels with micro-organisms. During the test period, the biochemical oxygen demand is measured continuously by means of a BOD-meter. Biodegradability is calculated on the basis of BOD and supplemental chemical analysis, such as measurement of the dissolved organic carbon concentration, concentration of residual chemicals, etc.

AS4351 is an Australian Standard in regards to the biodegradability of a product. Its purpose is to ensure that products are biodegradable and eco-friendly by requiring that products be tested by certified testing laboratories that at least 70% of the total ingredients used to make the product can readily biodegrade in 28 days. This standard is technically equivalent to ISO 7827-1994 and is based on OECD "Ready Biodegradability" tests 301A to 301E.

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended.

As used herein, a "sack" ("sk") is an amount that weighs 94 pounds (94 lb/sk)

As used herein, the conversion between gallon per sack (gal/sk) and percent by weight of cement (% bwoc) is 1 gal/sk=3.96% bwoc.

The conversion between pound per gallon (lb/gal or ppg) and kilogram per cubic meter (kg/m³) is: 1 lb/gal=(0.453592 kg/lb)×(gal/0.003785 m³)=120 kg/m³.

General Approach

Foamed cement contains gas which maintains sufficient pressure so as to prevent the fluid/gas migration during the transition of cement fluid into the set solid mass.

Cement slurry in an annulus loses its overbalance as a result of gelation and simultaneous volume reduction caused by the cement hydration processes. If the pore pressure of the gelled cement drops below reservoir pressure before the cement has started to harden, gas influx will occur. One method of combating the above pressure loss is to include gas in the cement. Compressed gas in the foam cement maintains pressure and ensures that there is no gas migration through the cement column.

Initial testing with a sulfonate derivative of an alkyl polyglycoside ("APG") provided very good results as a foaming surfactant for a cement slurry, as described in more detail below. The tested APG derivative was decyl polyglucoside hydroxypropylsulfonate sodium salt ("DPG HPS").

Based on this initial success using DPG HPS, a person of knowledge and experience in the field would be able extrapolate to similar chemicals that would be likely to work according to the principles of this disclosure.

A cement composition is provided, the composition comprising: (a) a hydraulic cement; (b) water; and (c) an alkyl polyglycoside derivative, wherein the alkyl polyglycoside derivative is selected from the group consisting of: sulfonates, betaines, an inorganic salt of any of the foregoing, and any combination of any of the foregoing.

Preferably, the cement composition additionally comprises a gas, whereby the cement composition is foamed.

A method of cementing a portion of a well is provided, the method comprising the steps of: (A) forming a cement composition according the disclosure; and (B) introducing the cement composition into the well.

Alkyl polyglycosides ("APGs") are a class of non-ionic surfactants. When derived from glucose, alkyl polyglycosides are more specifically known as alkyl polyglucosides. Alkyl polyglucosides have the following general chemical structure, where m and n are variables:

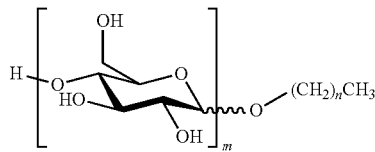

The chemical structure of alkyl polyglycosides derived from other sugar molecules is similar, except for the difference in the type of sugar molecule on which the polyglycoside is based.

Preferably, independently of the other parameters for the alkyl polyglycoside, the alkyl polyglycoside (APG) is derived from glucose, such that it is an alkyl polyglucoside.

For any type of alkyl polyglycoside, independently of the other parameters, preferably m is in the range of 2 to 20.

For any type of alkyl polyglycoside, independently of the other parameters, preferably n for the alkyl group is in the range of 8 to 24.

More preferably, the alkyl polyglycoside (APG) is an alkyl polyglucoside wherein preferably m is in the range of 2 to 20 and preferably n for the alkyl is in the range of 8 to 24.

The alkyl polyglycoside (APG) derivative is selected from the group consisting of: functionalized sulfonates, functionalized betaines, an inorganic salt of any of the foregoing, and any combination of any of the foregoing. Preferably, the sulfonate functionality is selected from the group consisting of hydroxyalkylsulfonates. More preferably, the alkyl group of the hydroxylalkylsulfonate functionality is selected from the group consisting of short-chain alkyl groups having in the range of 1 to 6 carbons. Preferably, an inorganic salt of the foregoing is selected from the group consisting of alkali metal, alkaline earth metal, and ammonium salts. Most preferably, the inorganic salt is an alkali metal salt.

Most preferably, the alkyl polyglycoside (APG) derivative is selected from the group consisting of:

(a) Decyl polyglucoside hydroxypropylsulfonate sodium salt;

(b) Lauryl polyglucoside hydroxypropylsulfonate sodium salt;

(c) Coco polyglucoside hydroxypropylsulfonate sodium salt;

(d) Lauryl polyglucoside sulfosuccinate disodium salt;

(e) Decyl polyglucoside sulfosuccinate disodium salt;

(f) Lauryl polyglucoside bis-hydroxyethylglycinate sodium salt;

(g) Coco polyglucoside bis-hydroxyethylglycinate sodium salt; and (h) any combination of thereof.

In an embodiment, the APG derivative is or comprises decyl polyglucoside hydroxypropylsulfonate sodium salt.

In a cement slurry, the APG derivative is preferably in a concentration in the range of 0.1% bwoc to 0.5% bwoc.

The APG derivatives can be used as foaming surfactants for light-weight cement compositions. The foaming surfactants are very effective. In addition, the foaming surfactants are compatible with tap water, seawater, NaCl, $CaCl_2$, and commonly-used fluid-loss control additives (such as a copolymer of acrylamide and 2-acrylamido-2-methylpropanesulfonic acid). The foaming surfactants can be provided in an aqueous solution and can be diluted with water as may be desired or required under local operating regulations. More importantly, the foaming surfactants are biodegradable and non-toxic. After setting, a foamed cement slurry according to the disclosure has sufficiently uniform density and good compressive strength.

While various gases can be utilized for foaming the treatment fluids, nitrogen, carbon dioxide, and mixtures thereof are preferred. In examples of such embodiments, the gas may be present in a treatment fluid in an amount in the range of from about 5% to about 98% by volume of the treatment fluid, and more preferably in the range of from about 20% to about 80%. The amount of gas to incorporate into the fluid may be affected by factors including the viscosity of the fluid and wellhead pressures involved in a particular application.

Methods of Cementing

According to another embodiment of the disclosure, a method of cementing is provided, the method including the steps of: (A) forming a cementing composition according to the disclosure; and (B) introducing the cementing composition into the well.

A cement slurry can be prepared at the job site, prepared at a plant or facility prior to use, or certain components of the cement slurry can be pre-mixed prior to use and then transported to the job site. Certain components of the cement slurry can be provided as a "dry mix" to be combined with fluid or other components prior to or during introducing the cement slurry into the well.

In certain embodiments, the preparation of a cement slurry can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Often the step of delivering a cement slurry into a well is within a relatively short period after forming the slurry, e.g., less within 30 minutes to one hour. More preferably, the step of delivering the cement slurry is immediately after the step of forming, which is "on the fly."

It should be understood that the step of delivering a cement slurry into a well can advantageously include the use of one or more fluid pumps.

Preferably, the step of introducing a cement slurry is at a rate and pressure below the fracture pressure of the treatment zone.

After the step of introducing a cement slurry and directing it to a desired treatment zone in a well, sufficient time should be allowed for the cement slurry to thicken, and preferably, sufficient time should be allowed for the cement slurry to set. This times should be under the design conditions in the zone of the well. Preferably, the step of flowing back is within 72 hours of the step of introducing. More preferably, the step of flowing back is within 24 hours of the step of introducing.

Preferably, after any such well treatment, a step of producing hydrocarbon from the subterranean formation is the desirable objective.

EXAMPLES

To facilitate a better understanding of the present disclosure, the following examples of certain aspects of some embodiments are given. In no way should the following examples be read to limit, or define, the entire scope of the disclosure.

TABLE 1

| | |
|---|---|
| Name: | Decyl polyglucoside hydroxypropylsulfonate sodium salt ("DPG HPS") |
| Activity: | 40.0% (aqueous solution) |
| pH (10% aqueous solution): | 7.0 |
| Flash Point: | >200° F. (93° C.) |
| Storage Temperature: | 50° F. to 100° F. (10° C. to 38° C.) |
| Specific gravity at 25° C.: | 1.10 |

Regarding biodegradability, DPG HPS reportedly achieved 80% to 82% biodegradability and exceeded the 70% biodegradability requirement for ready biodegradability of a single organic substance or natural product when tested according to AS4351 Part 2.

Regarding toxicological effects, this product is reported as being non-irritating, causing no visible skin reaction, and having an acute toxicity (Rat): Oral ingestion, greater than 2 g/kg, LD50, where all animals survived without any sign of toxicity.

Testing Procedures

The foaming surfactant was tested in a Class G cement slurry. The effect of tap water, seawater, NaCl, $CaCl_2$, and a commonly-used fluid-loss control agent was investigated. In a typical experiment, the cement was suspended in water to form slurry. The fluid-loss control agent used in the slurries was copolymer of acrylamide and 2-acrylamido-2-methyl-propanesulfonic acid. A calculated amount of the cement slurry was transferred to a foam can and then the foaming surfactant was added. A foam can is laboratory-scale mixing jar wherein the cement slurry and the foaming surfactant are mixed together to obtain foamed cement slurry, which has a capacity of 1,170 ml.

The base density of the cement slurry was measured before foaming of the slurry. The foaming was done for 20 seconds. The density of the foamed slurry was measured. The densities were measured using an atmospheric mud balance (a balance used to measure the density of the cement slurry at atmospheric pressure).

The foamed slurry was cured at 140° F. (60° C.) for 24 hours at atmospheric pressure in a water bath. The cured cement slurry was tested for density variation (sedimentation test). The cement slurry was cured in the form of cylinder (dimensions: about 1 inch diameter and about 6 inch length). The cured cylindrical samples were sliced into three portions of equal length. The densities were measured for the top, middle, and bottom portions of the cured sample. The stability of the foamed cement slurry through setting can be determined by measuring the variation in density. The allowed variation in density is up to about 0.5 ppg (60 $kg/m^3$) between the top, middle, and bottom portions of the cured sample.

In addition, the crush strength of each cured sample was measured.

The cement slurry compositions and results are given in Table 2.

TABLE 2

Slurry Compositions, Densities, and Crush Strengths

| Slurry No. | "Control" | 1 | 2 | 3 | 4 | 5 | 6 |
|---|---|---|---|---|---|---|---|
| Base density lb/gal (kg/m³) | 15.8 (1900) | 15.5 (1860) | 15.8 (1900) | 15.5 (1860) | 15.8 (1900) | 16.0 (1920) | 16.6 (1990) |
| Class G Cement base % | 100 | 100 | 100 | 100 | 100 | 100 | 100 |
| "DPG HPS" foaming surfactant gal/sk (% bwoc) | — | 0.087 (0.34) | 0.063 (0.25) | 0.087 (0.34) | 0.063 (0.25) | 0.063 (0.25) | 0.063 (0.25) |
| Fluid-loss control agent (% bwoc) | — | — | — | 0.6 | — | — | — |

TABLE 2-continued

Slurry Compositions, Densities, and Crush Strengths

| Slurry No. | "Control" | 1 | 2 | 3 | 4 | 5 | 6 |
|---|---|---|---|---|---|---|---|
| CaCl$_2$ (% bwoc) | — | — | — | — | 2.0 | — | — |
| NaCl (% w/w of water) | — | — | — | — | — | — | 18 |
| Water (% bwoc) | 45.10 | 47.6 | 44.6 | 47.6 | 44.65 | 45.10* seawater | 40.51 |
| Foam Can (g) | — | 1675.25 | 1675.11 | 1675.28 | 1675.15 | 1675.13 | 1675.26 |
| Foamed Density lb/gal (kg/m$^3$) | — | 11.3 (1360) | 11.2 (1340) | 13.0 (1560) | 11.8 (1420) | 11.8 (1420) | 12.3 (1480) |
| Cured at 140° F. (60° C.) for 24 hours |||||||||
| Top Density lb/gal (kg/m$^3$) | — | 10.16 (1220) | 10.45 (1254) | 12.68 (1522) | 11.60 (1392) | 11.35 (1362) | 11.88 (1426) |
| Middle Density lb/gal (kg/m$^3$) | — | 10.23 (1227) | 10.39 (1247) | 12.89 (1547) | 11.81 (1417) | 11.44 (1373) | 11.95 (1434) |
| Bottom Density lb/gal (kg/m$^3$) | — | 10.24 (12.29) | 10.59 (1271) | 12.97 (1556) | 11.57 (1388) | 11.50 (1380) | 11.98 (1438) |
| Crush Strength psi (Mpa) | — | 1045 (7.21) | 1189 (8.20) | 1021 (7.04) | 2060 (14.2) | 1977 (13.6) | 902 (6.22) |

In addition, Slurry No. 4 was tested after curing at 72° F. (22° C.) for 24 hours. For this test, the top, middle, and bottom densities were 12.12 lb/gal (1454 kg/m$^3$), 12.09 (1451 kg/m$^3$), and 12.12 lb/gal (1454 kg/m$^3$), respectively, and the crush strength was 330 psi (2.3 MPa).

Thickening time of cement slurries was also tested with the use of an HPHT consistometer. In order to compare the results to a conventional cement slurries, a cement slurry without any foaming surfactant ("Control" in Table 2), a cement slurry comprising a conventional alkyl polyglucoside foaming surfactant (TERRADRIL S 853 B™ commercially available from Baroid), and a cement slurry including "DPG HPS" as the foaming surfactant was tested (Slurry No. 2 in Table 2).

These slurries were tested at 140° F. (60° C.) and 240° F. (116° C.). The results shown in Table 3 demonstrate that the "DPG HPS" as a foaming surfactant did not significantly retard thickening time, whereas the conventional foaming agent did retard the thickening times.

TABLE 3

Thickening Times

| Slurry No. | Foaming Surfactant and Concentration | Thickening time at 140° F. (60° C.) (HR:MM) |
|---|---|---|
| Control | none | 1:15 |
| Conventional | Conventional Foaming Surfactant "TERRADIRIL S 853 B" at 0.041 gal/sk (0.252% bwoc) | 4:56 |
| 2 | "DPG HPS" Foaming Surfactant at 0.063 gal/sk (0.252% bwoc) | 1:28 |

The APG derivative performs well as a foaming surfactant for cement in a variety of different type of slurries, e.g., cement with tap water, seawater, or containing NaCl or CaCl$_2$; it is biodegradable; it is non-toxic; and do not reduce the compressive strength to set cement. Moreover, the material is compatible with fluid-loss control additives such as a copolymer of acrylamide and 2-acrylamido-2-methyl-propanesulfonic acid, which is a significant advantage. This material can be used anywhere in the world including the "North Sea region."

CONCLUSION

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (e.g., topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope and spirit of the present disclosure.

The various elements or steps according to the disclosed elements or steps can be combined advantageously or practiced together in various combinations or sub-combinations of elements or sequences of steps to increase the efficiency and benefits that can be obtained from the disclosure.

The disclosure illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A cement composition comprising:
   (a) a hydraulic cement;
   (b) water; and
   (c) an alkyl polyglycoside derivative, wherein the alkyl polyglycoside derivative is selected from the group consisting of: a sulfonate, an inorganic salt of any of the foregoing, and any combination of any of the foregoing; and
   (d) a gas, whereby the cement composition is foamed.

2. The cement composition of claim 1, wherein the alkyl polyglycoside derivative is derived from an alkyl polyglucoside having a chemical structure:

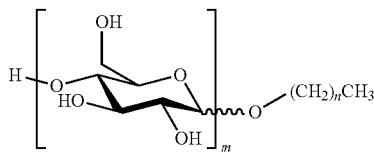

wherein n for the alkyl is 8 or greater, and
wherein m for the polyglucoside is 2 or greater.

3. The cement composition of claim 2, wherein n is in the range of 8 to 24.

4. The cement composition of claim 2, wherein m is in the range of 2 to 20.

5. The cement composition of claim 1, wherein the sulfonate comprises a hydroxyalkylsulfonate.

6. The cement composition of claim 5, wherein the hydroxylalkylsulfonate comprises a short-chain alkyl groups having in the range of 1 to 6 carbons.

7. The cement composition of claim 1, wherein the inorganic salt of the alkyl polyglycoside derivative is selected from the group consisting of: an alkali metal, an alkaline earth metal, and an ammonium salts.

8. The cement composition of claim 1, wherein the alkyl polyglycoside derivative comprises a decyl polyglucoside hydroxypropylsulfonate sodium salt.

9. The cement composition of claim 1, wherein the alkyl polyglycoside derivative is present in the cement composition in an amount from about 0.1% bwoc to about 0.5% bwoc.

10. The cement composition of claim 1, wherein the hydraulic cement is a Portland cement.

11. The cement composition of claim 1 further comprising an additive selected from the group consisting of: a resin, a latex, a stabilizer, a silica, a microsphere, an aqueous superabsorber, a viscosifying agent, a suspending agent, a dispersing agent, a salt, an accelerant, a retardant, a high-density material, a low-density material, a fluid loss control agent, an elastomer, a vitrified shale, a gas migration control additive, a formation conditioning agent, and any combination thereof.

12. A cement composition comprising:
   (a) a hydraulic cement;
   (b) water; and
   (c) an alkyl polyglycoside derivative selected from the group consisting of:
       (i) a decyl polyglucoside hydroxypropylsulfonate sodium salt;
       (ii) a lauryl polyglucoside hydroxypropylsulfonate sodium salt;
       (iii) a coco polyglucoside hydroxypropylsulfonate sodium salt;
       (iv) a lauryl polyglucoside sulfosuccinate disodium salt;
       (v) a decyl polyglucoside sulfosuccinate disodium salt;
       (vi) a lauryl polyglucoside bis-hydroxyethylglycinate sodium salt;
       (vii) a coco polyglucoside bis-hydroxyethylglycinate sodium salt; and
       (viii) any combination of thereof; and
   (d) a gas, whereby the cement composition is foamed.

13. The cement composition of claim 12, wherein the alkyl polyglycoside derivative is present in the cement composition in an amount from about 0.1% bwoc to about 0.5% bwoc.

14. A cement composition comprising:
   (a) a hydraulic cement;
   (b) water; and
   (c) an alkyl polyglycoside derivative, wherein the alkyl polyglycoside derivative is selected from the group consisting of: a betaine, an inorganic salt of any of the foregoing, and any combination of any of the foregoing; and
   (d) a gas, whereby the cement composition is foamed.

15. The cement composition of claim 14, wherein the alkyl polyglycoside derivative is derived from an alkyl polyglucoside having a chemical structure:

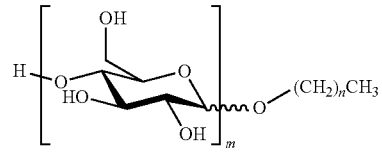

wherein n for the alkyl is 8 or greater, and
wherein m for the polyglucoside is 2 or greater.

16. The cement composition of claim 15, wherein n is in the range of 8 to 24.

17. The cement composition of claim 15, wherein m is in the range of 2 to 20.

18. The cement composition of claim 14, wherein the inorganic salt of the alkyl polyglycoside derivative is selected from the group consisting of: an alkali metal, an alkaline earth metal, and an ammonium salts.

19. The cement composition of claim 14, wherein the alkyl polyglycoside derivative is present in the cement composition in an amount from about 0.1% bwoc to about 0.5% bwoc.

20. The cement composition of claim 14 further comprising an additive selected from the group consisting of: a resin, a latex, a stabilizer, a silica, a microsphere, an aqueous superabsorber, a viscosifying agent, a suspending agent, a dispersing agent, a salt, an accelerant, a retardant, a high-density material, a low-density material, a fluid loss control agent, an elastomer, a vitrified shale, a gas migration control additive, a formation conditioning agent, and any combination thereof.

* * * * *